US012611889B2

(12) United States Patent
Spahr et al.

(10) Patent No.: US 12,611,889 B2
(45) Date of Patent: Apr. 28, 2026

(54) SPOKE, AND METHOD OF MANUFACTURING A SPOKE

(71) Applicant: DT SWISS INC., Grand Junction, CO (US)

(72) Inventors: Stefan Spahr, Lengnau (CH); Simon Hugentobler, Liebefeld (CH); Adrian Scheidegger, Liebefeld (CH)

(73) Assignee: DT SWISS INC., Grand Junction, CO (US)

( * ) Notice: Subject to any disclaimer, the term of this patent is extended or adjusted under 35 U.S.C. 154(b) by 819 days.

(21) Appl. No.: 17/938,404

(22) Filed: Oct. 6, 2022

(65) Prior Publication Data

US 2023/0106197 A1 Apr. 6, 2023

(30) Foreign Application Priority Data

Oct. 6, 2021 (DE) .......................... 102021125903.7

(51) Int. Cl.
B60B 1/04 (2006.01)
B60B 1/02 (2006.01)

(52) U.S. Cl.
CPC ............ B60B 1/041 (2013.01); B60B 1/0246 (2013.01); B60B 2310/208 (2013.01)

(58) Field of Classification Search
CPC ....... B60B 1/0246; B60B 1/041; B60B 1/003; B60B 2310/208; B21F 39/00
See application file for complete search history.

(56) References Cited

U.S. PATENT DOCUMENTS 9,731,546 B2 8/2017 Spahr et al.
10,029,511 B2 7/2018 Wathert et al.
(Continued)

FOREIGN PATENT DOCUMENTS

DE 29811076 U1 8/1998
DE 202015101124 U1 6/2016
(Continued)

OTHER PUBLICATIONS

German Search Report received for Application No. 10 2021 125 903.7, dated Sep. 22, 2022.
(Continued)

*Primary Examiner* — S. Joseph Morano
(74) *Attorney, Agent, or Firm* — Greer, Burns & Crain, Ltd

(57) ABSTRACT

A method of manufacturing a spoke, including: reshaping a wire material to obtain a spoke blank by a forging device; wherein the spoke blank includes pre-stages of the central section and the end portions and the transition sections; and wherein the pre-stages of the central section and the end portions are forged cylindrically; the pre-stages of the transition sections are forged conically, so that they show a diameter decreasing in the direction of the central section; wherein the pre-stages of the transition sections are each manufactured in a length which differs by a maximum of one fourth from the pertaining length of the transition section; reshaping the spoke blank by a shaping tool, which reproduces a negative shape of the spoke body, so that the spoke body is generated; wherein at least the transition sections and the central section are each provided with a cross-sectional geometry different from their pre-stages.

20 Claims, 5 Drawing Sheets

(56)          References Cited

U.S. PATENT DOCUMENTS

| | | | | |
|---|---|---|---|---|
| 10,696,092 | B2 | 6/2020 | Lafuente et al. | |
| 2005/0161998 | A1* | 7/2005 | Passarotto | B60B 1/003 |
| | | | | 301/61 |
| 2005/0173971 | A1 | 8/2005 | Passarotto et al. | |
| 2007/0138860 | A1 | 6/2007 | Cappellotto et al. | |
| 2007/0257089 | A1* | 11/2007 | Chen | B21K 1/34 |
| | | | | 228/173.1 |
| 2013/0285436 | A1* | 10/2013 | Davoine | B60B 1/0261 |
| | | | | 301/55 |
| 2016/0009125 | A1* | 1/2016 | Connolly | B60B 1/0246 |
| | | | | 301/58 |
| 2016/0257164 | A1 | 9/2016 | Spahr et al. | |
| 2019/0015891 | A1* | 1/2019 | Chen | B21F 39/00 |

FOREIGN PATENT DOCUMENTS

| | | | |
|---|---|---|---|
| DE | 102015114051 | A1 | 3/2017 |
| DE | 102017103312 | A1 | 8/2018 |
| EP | 3312021 | A1 | 4/2018 |

OTHER PUBLICATIONS

European Search Report Received for Application No. 22199890.9, dated Mar. 2, 2023.

* cited by examiner

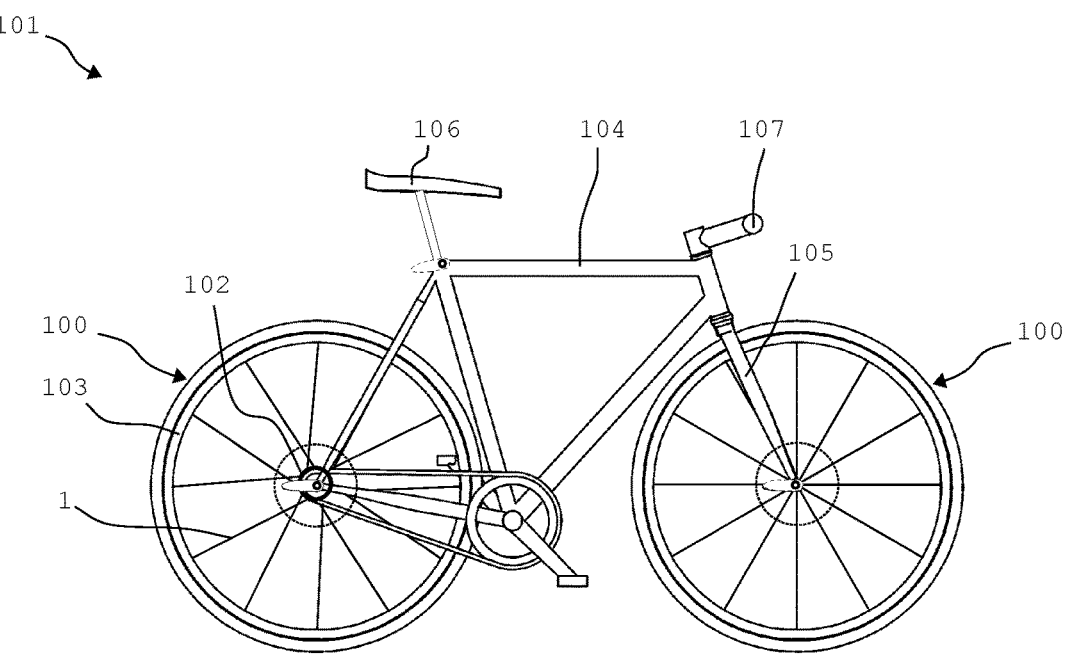
Fig. 1
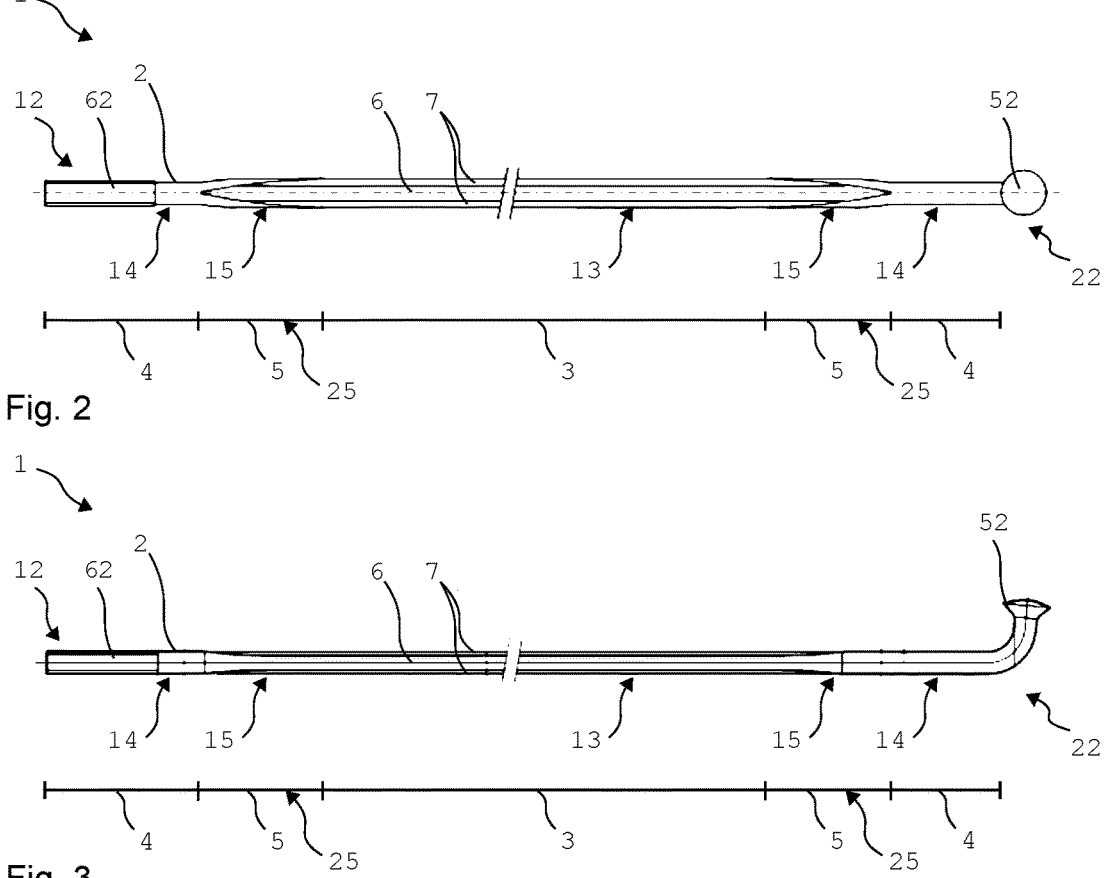
Fig. 2
Fig. 3

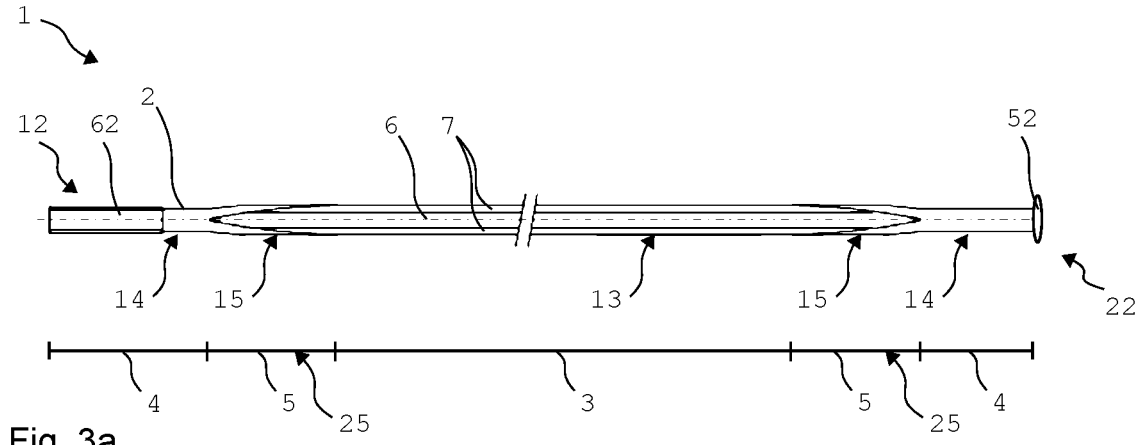
Fig. 3a
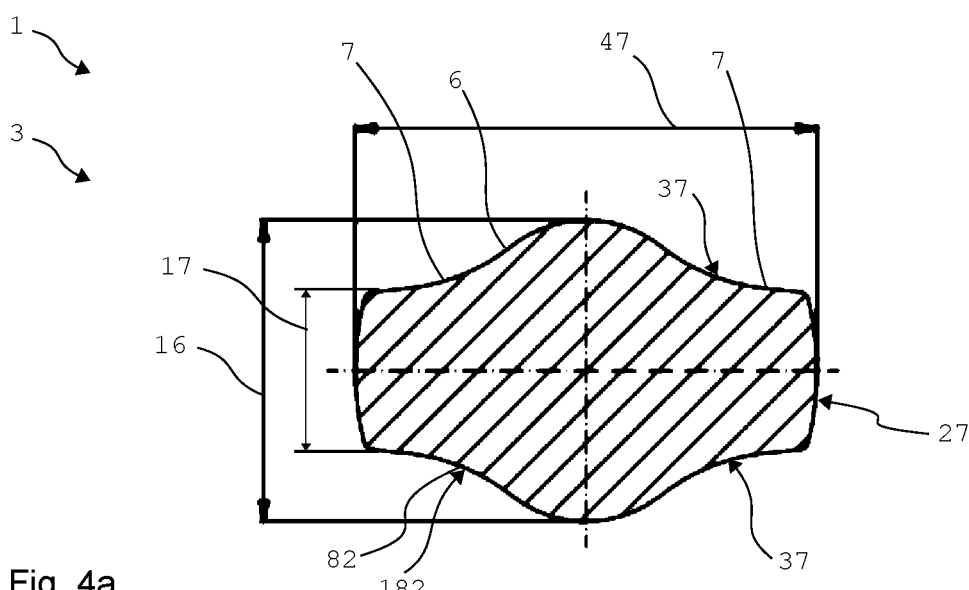
Fig. 4
Fig. 4a

SPOKE, AND METHOD OF MANUFACTURING A SPOKE

BACKGROUND

The present invention relates to a method of manufacturing a spoke for a wheel of an at least partially muscle-powered bicycle, and to a spoke.

The spokes are a decisive factor in the stability under load and the durability of wheels for bicycles. Since the spokes usually only transmit tensile forces between the rim and the hub, they require installation at an appropriate prestress. As a rule, such prestress must be high enough to be maintained even in view of the weight loads and the shocks occurring in operation, and of the rotational force introduced during accelerating and braking. This is why spokes in high-quality wheels must meet very high demands on the tensile strength and fracture strength.

Since the spokes are part of the rotating mass, reduction of the spoke weight has a great impact on the riding properties of the entire bicycle. However, the requirements described above on the tensile strength and fracture strength tend to prohibit lightweight construction.

For weight reduction, what are known as double-butted spokes have been disclosed. These are cylindrical spokes showing a reduced diameter in their elongated, central region. This reduces the weight, while the ends provide sufficient diameters to securely attach the spokes to the rim and the hub respectively. The transitions between the various diameters are tapered (also referred to as conical) as a rule.

A method of manufacturing these spokes is known from EP 3 135 396 B1. Other than saving weight, these spokes show the advantage that on the whole, the swaging process also considerably improves the material properties and thus the stability of the spoke under load.

Moreover, EP 1 569 809 B1 discloses spokes showing an elongated aluminum center part into which steel end elements are screwed. Steel braces the loads generated at the ends better than does aluminum. Due to the aluminum, the center part can be shaped in complex cross sections with little effort.

Moreover, particularly lightweight wheels are known with spokes made of fibrous composite materials.

Furthermore, the spokes greatly affect the wheel's air drag. Therefore, for example DE 29 811 076 U1 or EP 1 559 583 B1 disclose so-called blade spokes comprising a cross-section that is flat in the traveling direction, thus contributing to reduced aerodynamic drag.

The disadvantage of these blade spokes is, however, a considerably increased sensitivity to crosswinds so that bicycles so equipped show poorer control properties in windy conditions. Therefore, U.S. Pat. No. 10,029,511 B2 discloses spokes showing a cross section with an aircraft wing geometry in a radially outwardly region.

DE 10 2017 103 312 A1 discloses spindle spokes manufactured by means of shaping tools from a round wire material. The burrs showing on the longitudinal faces due to the shaping are removed by means of pressure rollers.

Spokes have shown to be advantageous if they are first manufactured as double-butted spokes, and thereafter reworked to generate an aerodynamic geometry. Such a spoke is known for example from EP 3 064 370 A3. However, although reworking improves the aerodynamic properties, it has been found that the strength properties of the spoke are not necessarily improved overall, or in some cases they may even deteriorate.

It is therefore the object of the present invention to provide an improved option for optimizing such a spoke as regards the weight and the air drag. Along with this, however, the reliability and the strength properties of the spoke are likewise intended to be improved overall.

SUMMARY

The method according to the invention serves to manufacture a spoke for a wheel of an at least partially muscle-powered bicycle. The spoke comprises a spoke body, which in the intended installed position in a wheel includes, and extends between, a hub-side, first end, and a rim-side, second end. The spoke body comprises at least one central section extending between the ends, and at least two transition sections. One end portion is attributed to one end each. At least one transition section each is disposed between the at least one central section and the end portions.

The method according to the invention comprises the following method steps in the sequence indicated or in another useful sequence: (First) reshaping and, in particular, cold forging by means of a forging device, of a wire material that is, in particular, cylindrical, obtaining a spoke blank. The spoke blank shows a pre-stage of the central section, and pre-stages of the end portions, and pre-stages of the transition sections. The pre-stages of the central section and of the end portions are forged cylindrically. In particular, is the pre-stage diameter of the central section reduced more than are the pre-stages of the end portions. The pre-stage of the central section shows a smaller diameter than the pre-stages of the end portions. The pre-stages of the transition sections are forged tapered (respectively conically) so as to show a diameter decreasing toward the central section. The pre-stages of the transition sections are, in particular, manufactured in lengths which differ by a maximum of one fourth and preferably a maximum of one fifth from the (provided) length of the transition section (i.e. the one formed from the pre-stage). In other words, the lengths of the pre-stages of the transition sections, in particular, equal the lengths of the pertaining transition section +/−¼ and preferably +/−⅕. Placing the spoke blank in a shaping tool. Preferably, the shaping tool at least partially reproduces a negative shape of the spoke body (in particular, by means of at least one negative shaping tool/negative mold). Reshaping and, in particular, cold forging of the spoke blank by means of the shaping tool (so as to form the spoke body). In other words, the (second) reshaping converts the spoke blank to the spoke body. Then, in particular, the pertaining pre-stages are reshaped to form the transition sections, end portions, and the central section. Then, at least the transition sections are provided with a cross-sectional geometry different from their pre-stages at least in sections (and preferably so is at least one of the end portions, at least in sections). In other words, the cylindrical respectively conical cross-sectional shapes of the pre-stages are at least partially reshaped to a different cross-sectional geometry that is non-cylindrical respectively non-conical.

In particular, the pre-stages of the transition sections are manufactured in a length which differs by a maximum of one sixth and preferably a maximum of one seventh, and particularly preferably by a maximum of one eighth, from the pertaining lengths of the transition sections. In particular, does the length of the pre-stages of the transition sections differ from the length of the transition sections by a maximum of +/−2 mm and preferably +/−1.5 mm and particularly preferably +/−1 mm.

The maximum differences of the lengths described, in particular, also refer to the length of the negative shape (or counterpart shape) for the transition sections in the shaping tool. The length of the transition section of the finished spoke body is, in particular, determined by the lengths of the transition sections in the negative shape. This also applies, in particular, to the end portions and, in particular, to the central section as well. The shaping tool may preferably also be referred to as a negative mold.

The present invention offers many advantages. A considerable advantage is obtained by the specifically shaped pre-stages of the spoke blank in combination with the subsequent reshaping to generate the new cross-sectional geometry. The pre-stages and the subsequently shaped cross-sectional geometry are optimally matched to one another. A particular advantage is the fact that the pre-stages of the transition sections are manufactured in a length that is specifically matched to the length of the finished transition sections. It has been shown that the lengths of the pre-stages of the transition sections are particularly crucial to the strength of the future spoke. At the same time, it is thus very uncomplicated while still being effective to adapt the spoke blank (e.g. by way of open-die forging) to a specific negative shape of the spoke body in the shaping tool.

Examinations have shown that matching the pre-stages of the transition sections to the subsequent reshaping obtains advantageous effects on the tensile strength and particularly on the fracture strength of the finished spoke. Thus, the method according to the invention particularly forges the spoke blank (including by means of open-die forging or absent a shaping tool with a negative mold) so that it can subsequently be reshaped (by means of a shaping tool with a negative mold) to obtain an aerodynamic cross-sectional geometry, without adversely affecting, or even while considerably improving, the specific material properties of the forged spoke blank.

It is particularly preferred and advantageous for the minimal diameter of the central section to be smaller than the minimal diameter of the end portions (after reshaping by means of the shaping tool). It is also advantageous and preferred for the transition sections to show a minimal diameter that decreases in the direction towards the central section. The diameter may decrease continuously or variably.

It has been shown that such matching of the cross-sectional geometries of the spoke blank and the finished spoke body maintains or even improve the advantageous strength properties of the spoke blank even after shaping the new cross-sectional geometry. Thus, for example an aerodynamic cross-sectional geometry showing particularly high tensile strength and fracture strength is feasible. Moreover, such a configuration does not adversely affect the strength even if the pre-stage of the transition section is somewhat longer or shorter than the finished transition section.

It is preferred and advantageous for the pre-stages of the transition sections to show cone angles of maximally 11°, and preferably maximally 10°, and particularly preferably maximally 9°. These cone angles allow a particularly uncomplicated manufacture of the pre-stages of the transition sections, at a suitable tolerance. This also enables a speedy and thus economic manufacture of the spoke blank, e.g. by way of open-die forging. In the scope of the present invention, a cone angle is, in particular, understood to mean the opening angle of the cone. When considering the angle between the circumferential surface of the cone and the central axis of the spoke body, the indicated angles need to be halved.

It is preferred for the size of the cone angle to be determined in dependence on the length of the transition section and/or the difference in diameters which the transition section is intended to overcome. The cone angle lies, in particular, at the top end of the angles or angular ranges defined, if the transition section must overcome a large difference in diameters between the end portion and the central section. The cone angle lies, in particular, at the bottom end of the angles or angular ranges defined, if the transition section must overcome a small difference in diameters between the end portion and the central section.

In addition or in the alternative, the cone angle can be chosen according to the length of the pre-stage of the transition section. In particular, given a maximum difference in diameters of 0.75 mm, a cone angle of maximally 11°, and preferably maximally 10°, and particularly preferably maximally 9° is provided. In particular, given a maximum difference in diameters of 0.6 mm or 0.5 mm, a cone angle of maximally 8°, and preferably maximally 7°, and particularly preferably maximally 6° is provided.

It is preferred and advantageous for the transition sections to be provided with a minimal diameter decreasing in the direction toward the central section, due to reshaping by means of the shaping tool. In particular, does the decrease of the minimal diameter correspond to the diameters of the pre-stages of the transition sections (decreasing in the direction of the central section). It is also possible for the decrease of the minimal diameter of the transition sections to correspond to the cone angle of the pre-stages of the transition sections. It is possible for the transition sections to each show a cone angle that corresponds to the cone angle of the pertaining pre-stage of the transition sections. The term "corresponding" is, in particular, understood to mean that the cone angles are related in terms of a function or a factor, or that they differ by maximally 10% and preferably maximally 5%.

Preferably, the pre-stages of the transition sections are manufactured in a length that is at least 14 times, and, in particular, at least 16 times, and particularly preferably at least 18 times the differential amount between the diameter of the pre-stage of the central section, and the diameter of the pre-stages of the end portions. Then, in particular, do the transition sections of the finished spoke body likewise show such a length.

It is also possible and advantageous for the pre-stages of the transition sections to be manufactured in a length that is at least 15 times, and preferably at least 16 times, and particularly preferably at least eighteen times the differential amount between the minimal diameters of the end portions and the minimal diameter of the central section.

This dimensioning of the pre-stages of the transition sections is preferably provided in configurations showing a differential amount of at least 0.35 mm, and preferably at least 0.4 mm. For configurations having a smaller differential amount, for example less than 0.3 mm, and preferably less than 0.27 mm, it is preferred for the pre-stages of the transition sections to be manufactured in a length that is at least 20 times, and, in particular, at least 23 times, and particularly preferably at least 25 times the differential amount between the diameter of the pre-stage of the central section and the diameters of the pre-stages of the end portions.

It is preferred for the pre-stages of the transition sections to be manufactured in a length that is at least 3 times, and, in particular, at least 3.5 times, and particularly preferably at least 4 times, the diameter of the pre-stages of the end portions.

In advantageous configurations, the pre-stages of the transition sections each show a length of at least 7 mm and preferably at least 7.5 mm. It is preferred and advantageous for the pre-stages of the transition sections to each show a length between 8 mm+/−1 mm, and 10 mm+/−1 mm, and preferably a length of 9 mm+/−1 mm.

It has been shown that these length specifications allow to manufacture the spoke blank with particularly suitable tolerances. This is, in particular, advantageous for spoke blanks shaped by open-die forging of a continuous wire material (i.e. without a shaping tool with a negative mold). Moreover, given these lengths, the tolerances do not adversely affect the strength of the finished spoke.

In a particularly preferred configuration, the transition sections each show a length which is at least 5 times, and preferably at least 6 times, the minimal diameter of the central section. In particular, is the minimal diameter of the central section smaller than the minimal, and, in particular, also the maximal, diameter of the end portions. This is provided, in particular, where the end portion is cylindrical in cross section.

In an advantageous configuration it is provided for the transition sections to differ from their pertaining pre-stages, in respect of their length and/or their position on a longitudinal axis of the spoke body, by maximally 2 mm, and preferably maximally 1.5 mm, and particularly preferably, maximally 1 mm. The position on the longitudinal axis of the spoke body can for example be defined by way of the distance of the transition section from the central section, or from an end portion, or from an end of the spoke.

In particular, between the diameter of the pre-stage of the central section and the pertaining diameters of the pre-stages of the end portions, a difference in diameters is provided amounting to between 0.4 mm and 0.8 mm. In particular, do the pre-stages of the transition sections bridge this difference in diameters. Particularly preferred is e.g. a difference in diameters of 0.43 mm (in particular, +/−0.02 mm). Configurations having a smaller difference in diameters are also possible, for example for wheels having particular high load inputs. Then, the difference in diameters may be between 0.20 mm and 0.4 mm. Then, e.g. a difference in diameters of 0.25 mm (in particular, +/−0.02 mm) is particularly advantageous.

The lengths described above for the pre-stages of the transition sections are particularly advantageous, in particular, in the case of a differential amount showing at least one sixth, and preferably at least one fifth, and particularly preferably at least one fourth, of the diameter of the pre-stages of the end portions. It is for example advantageous for the differential amount to be 0.5 mm+/−0.1 mm. In specific cases, for example for particularly lightweight spokes for road sports bicycles, the differential amount may be 0.7 mm+/−0.1 mm.

For configurations with smaller differences in diameters it is preferred and advantageous for the differential amount to be at least one ninth, and preferably at least one eighth, and particularly preferably at least one seventh, of the diameter of the pre-stages of the end portions. Then it is for example advantageous for the difference to amount to 0.3 mm+/−0.1 mm.

In advantageous configurations, the diameter of the pre-stages of the end portions is for example 2 mm+/−0.1 mm, and substantially 2 mm. In advantageous configurations, the diameter of the pre-stage of the central section is for example 1.5 mm+/−0.25 mm. The diameter of the pre-stage of the central section is, in particular, at least 1.25 mm, and maximally 1.65 mm. The pre-stage of the central section, in particular, shows a diameter of 1.5 mm+/−0.1 mm. Configurations (for example for particularly lightweight wheels) are likewise possible where the pre-stage of the central section has a diameter of 1.3 mm+/−0.1 mm.

In all the configurations it is preferred that by way of reshaping the spoke blank, the shaping tool forms a spoke body wherein at least 75% of the length of the transition sections, and preferably at least 90% of the length of the transition sections, and particularly preferably at least the entire length of the transition sections is used to match the minimal diameter of the central section to the pertaining minimal diameter of the end portions. This utilizes a large part or all of the transition section for matching the various diameters to one another. Thus, short or steep transitions are avoided. Moreover, an uncomplicated while reliable guarantee is provided for the finished spoke body to not show any inconvenient geometric deviations compared to the spoke blank, which might result in reduced tensile strength and/or fracture strength.

Reshaping the spoke blank by means of the shaping tool forms at least the pre-stages of the transition sections and the pre-stage of the central section, preferably so that their cross sectional circumferences are modified to a greater extent than their cross sectional areas. In other words, reshaping the spoke blank by means of the shaping tool specifically modifies the relation of the cross sectional circumference to the cross sectional area. Thus, it is reliably achieved that larger tolerances and for example length deviations in the pre-stages of the transition sections do not, or only marginally, adversely affect the tensile strength and fracture strength of the finished spoke.

In the spoke blank, the cross sectional circumference is, in particular, proportional to the cross sectional area. In the finished spoke body, the cross sectional circumference in the transition section may, in some sections, be inversely proportional to the cross sectional area. In other words, in the finished spoke body the cross sectional circumference may increase in the transition section, although the cross sectional area decreases in the direction of the central section. It is also possible and advantageous that in the finished spoke body, the cross sectional circumference in the transition section decreases less in the direction of the central section, than does the cross sectional area. It is, in particular, provided that the proportionality factor, respectively the ratio of the cross sectional circumference to the cross sectional area, changes due to the reshaping of the spoke blank in the spoke body.

Following the reshaping by means of the shaping tool, the cross sectional circumference decreases, in particular, less than does the cross sectional area. The cross sectional circumference, in particular, even increases in sections in the direction of the central section, while the cross sectional area decreases. The cross sectional circumference and the cross sectional area remain, in particular, constant in the central section (substantially, e.g. 90% or more).

In particular, is the spoke blank reshaped by means of the shaping tool such that at least the central section is provided with a larger cross sectional circumference than a pre-stage, and/or that at least the transition sections are each provided with a larger cross sectional circumference than their pre-stages. In particular, is the cross sectional circumference enlarged during reshaping by means of the shaping tool, at least in the central section.

During reshaping of the spoke blank by means of the shaping tool, the cross sectional area, in particular, is substantially not changed. In particular, provided is a maximum reduction of the cross sectional area of 10%, and particularly preferably maximally 5% or even as little as 2%. In particular, is the cross sectional area not enlarged by reshaping by means of the shaping tool.

In particular, does a cross sectional area of the spoke body decrease in a transition section, preferably in both the transition sections, in the direction of the central section, in particular, while there the cross sectional circumference decreases, either by a smaller measure than does the cross sectional area, or even increases.

In particular, does the cross sectional circumference in the transition section first decrease by a smaller measure in the direction of the central section than does the cross sectional area, and thereafter increase. In particular, in the central section the ratio of the cross sectional circumference relative to the cross sectional area is constant (substantially and e.g. 90% or more). In particular, in the central section the ratio of the cross sectional circumference relative to the cross sectional area is larger than in the end portions and/or in the transition sections.

In a particularly advantageous specific embodiment, the spoke blank is reshaped by means of the shaping tool such that the spoke body shows a body and two wings, at least in the transition sections, at least in sections. This geometry has been found advantageous so that undesired tolerances and for example length deviations in the pre-stages of the transition sections do not, or only marginally, adversely affect the desired tensile strength and fracture strength of the finished spoke. The wings and the body, in particular, allow an advantageous stabilization of the transition sections, if they are specifically positioned in the pre-stages of the transition sections.

The final shaping of the body and the wings in combination with placement of these structures in the transition sections has enabled improvement of the fracture strength and also the tensile strength. At the same time, the final shaping of the body and the wings saves weight since the transitions can on the whole be made thinner, without adversely affecting durability. Moreover, a geometry having a body and wings offers advantageous aerodynamic properties. It has been observed that the final shaping of the body and the wings, without taking into account the geometric properties of the pre-stages of the transition sections, does not result in any significant improvements.

The wings, in particular, are integrally connected with the body. The wings extend, in particular, on opposite longitudinal faces of the body. The body and the wings are, in particular, configured in the central section at least in sections. The body and the wings are, in particular, configured in the entire central section. Alternately, the body and the wings may be configured in sections, in at least one of the end portions. The shaping tool comprises, in particular, a negative shape of the spoke body with a body and wings. In other words, the shaping tool reproduces a negative shape of the spoke body with a body and wings. The shaping tool is, in particular, configured such that it can shape the spoke blank to obtain the properties of the body and the wings described presently.

The wings extend, in particular, laterally on the body. The wings are, in particular, disposed on opposite sides of the body. The wings and the body, in particular, extend over the entire length of at least one transition section and preferably of both the transition sections. The body and the wings are, in particular, configured continuously in the central section and in the transition sections. The body and the wings are, in particular, configured continuously from a transition section across the central section to the next transition section.

Preferably, the width of the wings is configured increasing, at least where the diameters of the pre-stages of the transition sections had previously been configured decreasing. The wings are, in particular, configured wherever the pre-stages of the transition sections had been formed in the spoke blank.

The wings and the body, in particular, extend into at least one of the two end portions and preferably into both of the end portions. The end portions are, in particular, configured cylindrical at least in sections, external of the wings and the body.

Preferably, the body shows a section height that is larger than the section height of the wings. In the central section, in particular, the section height of the wings is smaller than is the section height of the body.

Preferably, the body shows a rounded cross-sectional geometry. The body, in particular, shows a round or oval, in particular, elliptical, cross section. The body is, in particular, configured cylindrical or prismatic, having an oval or elliptical cross section. Alternately, the body may show a cross section corresponding to a rounded rectangle or a rounded square. Then, the body is, in particular, configured prismatic, showing such a cross section. Part of the body, in particular, is hidden by the wings. The body, in particular, extends beyond the wings above and beneath a principal side of the wings.

The cross-sectional geometry of the body, in particular, coalesces with the cross-sectional geometry of the wings. The spoke body, in particular, shows a cross-sectional geometry composed of the cross-sectional geometry of the body and the wings. It is possible for the cross-sectional geometry of the body in the central section to be configured swage-set in relation to the cross-sectional geometry of the body in the transition sections and/or in the end portions.

Preferably, at least in the transition sections and in the central section the spoke body shows a cross-sectional geometry in which the wings make a transition to the body by way of a curved outline. The wings, in particular, make a transition to the body in a curved outline, including a turning point. The body, in particular, makes a transition to the wings by changing the bend radius. The body and the wings, in particular, show different radii of curvature.

It is also possible for the wings to make a transition to the body in curved outlines, absent a turning point. In this case, the cross-sectional geometry of the spoke body can be designated as lenticular.

The wings, in particular, are configured curved on their principal sides. Preferably, the wings are curved in a different radius than is the cross-sectional geometry of the body. It is also possible for the wings to show straight principal sides, at least in sections.

It is also possible for the body and the wings to show cross-sectional geometries whose curves show the same radii. Then it is preferred for the radii for the body and the wings to originate in different (imaginary) circle centers. Thus, for example a cross-sectional geometry of the spoke body ensues which is formed by four partially overlapping circles. One circle each is provided for the wings, while two circles form the body. Such a cross-sectional geometry may be referred to as a quatrefoil.

The wings are, in particular, aligned centrally on the body. The wings are, in particular, disposed on the body mirror-symmetrical to one another. The longitudinal axis of the spoke body, in particular, forms the axis of symmetry. The wings are, in particular, configured identical. The wings, in particular, show the same length. The body and the wings together, in particular, form a symmetric cross section.

The wings, in particular, are curved convexly at least in sections on their short sides facing away from the body. In other words, the wings are outwardly convex on their short sides.

In particular, is the section height of the wings configured increasing in the direction of the body. The section height of the wings, in particular, increases transverse to the longitudinal direction. This configuration is, in particular, provided at least in the central section. This, in particular, results in a continuous transition of the wings to the body.

The wings and/or the body, in particular, remain unchanged over at least a predominant part of the central section, and preferably over at least 90% of the central section, or over the entire central section.

It is advantageous and preferred for the wings and/or the body to show a variable cross-sectional geometry in at least one of the transition sections and preferably in both transition sections. In particular, is the measure for variations to the cross-sectional geometry the same in both of the transition sections.

Preferably, the width of the wings increases in the direction of the central section, in at least one of the transition sections and, in particular, in both the transition sections. The width of the wings, in particular, decreases in the direction of the end portion in the transition sections. The width of the wings in the central section and, in particular, also in sections of the transition sections is larger than the minimal, and preferably also the maximal, diameter in the end portions. Preferably, the width of the wings is (substantially) constant in the central section.

Preferably, the section height of the wings decreases in the direction of the central section, at least in one of the transition sections and preferably in both the transition sections. The section height of the wings, in particular, increases in the direction of the end portion in the transition sections. In this way, in particular, the wings make a continuous transition to a cylindrical geometry of the end portion. In other words, in the transition sections the wings show an increasing section height and/or decreasing width in the direction of the end portion. It is also possible for the section height of the wings to remain unchanged in the transition section. The section height of the body in the central section, in particular, is less than is the minimal diameter in the end portions.

Preferably, the section height of the body decreases in the direction of the central section, at least in one of the transition sections and preferably in both the transition sections. In the transition section, in particular, the body shows a section height increasing, and/or a section width decreasing, in the direction of the end portion. The body may be configured showing a (parabolic) curve in the transition section. The cross-sectional geometry of the body may vary in the longitudinal direction such that at least one (in particular both) of the ends of the body lying in the longitudinal direction is parabolic. Alternately, the section width of the body may remain unchanged in the transition sections.

The section width of the body, in particular, refers to an imaginary cross section of the body projected into the total cross section of the spoke body, with the aid of a geometric shape (e.g. a circle or an ellipse or a quadrangle).

Alternately, advantageous configurations may be provided wherein the spoke blank is reshaped by means of the shaping tool such that the spoke body shows, at least in sections, at least in the transition sections and preferably in the central section as well, a cross-sectional geometry which is configured like a blade spoke or like an aircraft wing, or which is oval respectively elliptic.

The reshaping of the wire material to obtain a spoke blank is done, in particular, by way of cold forging of the wire material by means of at least one forging device. The reshaping of the wire material to obtain a spoke blank is done, in particular, by means of at least two impacting tools of the forging device, disposed opposite and impacting on the wire material, preferably while rotating about the longitudinal axis of the wire material (so-called rotary swaging). This type of forging is also referred to as free-form forging respectively open-die forging, since there is no negative mold which would specify the resulting shape.

However, for technical reasons the free-form forging of the wire material to obtain a spoke blank may show, other than the known advantages, great deviations in the length and position of each of the pre-stages and particularly the pre-stages of the transition sections. In view of this there is the problem that, for technical reasons, the negative shape of the shaping tool for the subsequent reshaping of the spoke blank, cannot be changed. In other words, the lengths of each of the sections, for example the transition sections, are firmly specified due to the shaping tool.

One option of manufacturing the spoke blank at particularly narrow tolerances is, to reduce the relative speed between the wire material and the forging device (as described for example in EP 3 135 396 B1).

In the scope of tensile tests it has been shown that the reshaping of the spoke blank to manufacture a new cross-sectional geometry may result in a deteriorated spoke strength, if the new cross-sectional geometry does not take into account the lengths of the pre-stages of the transition sections. It is therefore decisive for the spoke blank and the negative shape to be specifically matched to one another.

The present invention ensures in a very uncomplicated way that the negative shape for the new transition sections lies in the shaping tool in the exact spots where the pre-stages of the transition sections are disposed in the spoke blank. Moreover, the geometric configurations presently presented of the pre-stages (in particular length, cone angle) and the transition sections (in particular body and wings) ensure a particularly high strength of the spoke even if the pre-stages show greater tolerances. Thus the pre-stages of the transition sections can be finally shaped so that the subsequent reshaping by means of the shaping tool does not result in any undesired impairment of the strength of the finished spoke, or even results in increased strength. Moreover, the speed does not need to be reduced at all, or at least to some extent only.

The impacting tools, in particular, each comprise a duct-type forging section. The forging section serves to enclose part of the wire material. The forging sections, in particular, each comprise two secondary sections and one primary section lying between the secondary sections (in the longitudinal direction of the forging section and/or of the wire material). The secondary sections are, in particular, each disposed at an angle relative to the primary section. The secondary sections, in particular, lie on a plane shared with the primary section. The longitudinal axis of the wire material being processed, in particular, also runs through this plane. These impacting tools allow particularly good manufacturing of the properties of the spoke blank presently described. Preferably, the forging section shows, at least in sections, a concave rounding transverse to the longitudinal direction (and/or advancing direction) of the wire material processed. In a particularly preferred configuration, the negative shape of the body serves as a positioning device for placing the spoke blank in the shaping tool. Preferably, the negative shape of the body also serves to fix the spoke blank during reshaping by means of the shaping tool.

In reshaping, in particular, the wire material moves in the direction of its longitudinal axis relative to the forging device. Preferably, the speed of this relative motion is reduced while the transition sections are being forged. Thus, the final shaping of the transition sections can be still more precisely adapted to the negative shape of the shaping tool.

The spoke according to the invention is provided for a wheel of an at least partially muscle-powered bicycle. The spoke comprises a spoke body, which (when installed in the wheel in the intended installed position) shows a hub-side, first end, and a rim-side, second end, and at least one central section extending between the ends. One end portion is attributed to one end each. The minimal diameter of the central section is smaller than the minimal diameter of the end portions. One transition section each is disposed between the at least one central section and the end portions. The transition section shows a minimal diameter decreasing in the direction of the central section. At least in the transition sections, the spoke body has one body and two wings, at least in sections. The wings extend on opposite longitudinal faces of the body. Preferably the width of the wings increases in at least one of the transition sections in the direction of the central section. The transition sections, in particular, each show a length which is at least 4 times, and preferably at least 5 times, and particularly preferably at least 6 times, the minimal diameter of the central section, and/or at least 3.5 times, and preferably at least 4 times, the minimal diameter of the end portions. The transition sections, in particular, each show a length which is at least 4.5 times or even at least 5 times, the minimal diameter of the end portions.

The spoke according to the invention also particularly advantageously solves the object indicated above. It has been shown that this length of the transition sections in combination with the body-wings geometry is particularly decisive to the strength of what is to be made into the spoke.

The minimal diameter of the central section, in particular, corresponds to the (minimal) section height of the body in the central section. The minimal diameter of the end portions, in particular, corresponds to the diameter of the end portions, if their configuration is cylindrical.

It is possible and advantageous for the transition sections to each show a length which is at least 14 times, and, in particular, at least 16 times, and particularly preferably at least 18 times the differential amount between the minimal diameter of the end portions and the minimal diameter of the central section.

This dimensioning of the pre-stages of the transition sections is preferably provided in configurations showing a differential amount of at least 0.35 mm, and preferably at least 0.4 mm. For configurations having a smaller differential amount, for example less than 0.3 mm, and preferably less than 0.27 mm, it is preferred for the pre-stages of the transition sections to be manufactured in a length that is at least 20 times, and, in particular, at least 23 times, and particularly preferably at least 25 times the differential amount between the diameter of the pre-stage of the central section and the diameters of the pre-stages of the end portions.

The spoke according to the invention is manufactured, in particular, according to the method described above. The method is, in particular, configured so as to allow manufacturing the spoke presently described. The spoke is, in particular, configured so that it can be manufactured according to the method presently described. It is possible, and independent of the manufacturing method chosen, for the spoke according to the invention to show spatial-physical features as described above in the scope of the manufacturing method for the spoke. The spoke according to the invention may also be manufactured according to a different method.

The applicant reserves to right to claim a wheel that is provided for an at least partially muscle-powered bicycle. The wheel comprises at least one hub and at least one rim. The hub is connected with the rim by means of a plurality of spokes. The spokes are each configured, in particular, as described above. The spokes are, in particular, manufactured according to the method described above.

Preferably, the wheel is configured such that the spokes each show one transition section disposed closer to the hub-side end, and one transition section disposed closer to the rim-side end. The transition sections attributed to the same ends differ in respect of their positions on a longitudinal axis of the spoke by maximally 2 mm, and, in particular, maximally 1.5 mm, and preferably maximally 1 mm.

In respect of an installed position as intended in a wheel, the wings are, in particular, aligned so that the plane extending through both the wings is parallel to the wheel plane.

The spoke, in particular, comprises at least one spoke head and/or at least one thread. The spoke head is, in particular, configured at one end of the spoke. The spoke head is, in particular, downstream from the end portion. The thread is, in particular, configured on the other of the end portions. The spoke head and/or the thread is/are, in particular, configured integrally with the spoke body. The spoke is provided, in particular, by the spoke body and the spoke head and/or the thread.

The spoke body is, in particular, configured integrally. The wings, in particular, are integrally connected with the body. The central section and the end portions and the transition sections, in particular, are configured integrally with the spoke body.

The transition sections, in particular, are configured symmetrical to one another. The transition sections are, in particular, configured identical. It is possible for the transition sections to be configured partially different, for example differing in their lengths. The transition sections are, in particular, configured symmetrical to one another in respect of their cross-sectional geometries and/or in respect of variations to their cross-sectional geometries along the longitudinal axis. For technical reasons, the conical shape of the pre-stages of the transition sections may deviate from an ideal conical shape.

The end portions may be configured identical. It is possible for the end portions to differ in their lengths. The end portions, in particular, each show the same cross-sectional geometry. Alternately it is possible for the end portions to differ in their cross-sectional geometries.

Given a configuration showing body and wings, the section height of the body, in particular, corresponds to the minimal diameter. Thus, in the configurations described above, the minimal diameter may be used synonymously with the section height of the body.

The shaping tool is preferably configured so as to allow shaping the spoke described above (in one process step). The negative shape is, in particular, configured so that the spoke body described above is shaped. The shaping tool, in particular, comprises at least two tool units. The at least two tool units together, in particular, form the negative shape of the spoke body. The at least two tool units, in particular, are that it is reshaped to form the spoke body in the new cross-sectional geometry.

The boundary between the transition section and the following central section respectively end portion is defined, in particular, by the fact that the minimal diameter in the transition section decreases in the direction of the central section, and that the minimal diameter in the central section respectively end portion remains (substantially) constant. In other words, the central section respectively the end portion preferably begins where the variable cross-sectional geometry of the transition section ends (and a constant cross-sectional geometry begins). The transition section, in particular, provides a transition from a (substantially) constant cross-sectional geometry to another (substantially) constant cross-sectional geometry.

The minimal diameter, in particular, in the central section and/or in the end portions is (substantially) constant. The cross-sectional geometry of the central section and/or of the end portions, in particular, is (substantially) constant. The cross sectional circumference and the cross sectional area of the central section and/or of the end portions, in particular, are (substantially) constant. The body and the wings, in particular, in the central section are (substantially) constant in respect of their cross-sectional geometry (section height, section width, width etc.). The body and the wings in the end portions, in particular, are not configured at all or configured (substantially) constant in respect of their cross-sectional geometries in the end portions.

Further advantages and features of the present invention can be taken from the exemplary embodiments which will be described below with reference to the enclosed figures.

BRIEF DESCRIPTION OF THE DRAWINGS

The figures show in:

FIG. 1 a schematic side view of a bicycle;

FIG. 2 a schematic illustration of a spoke in a top view;

FIG. 3 the spoke according to FIG. 2 in a side view;

FIG. 3*a* a schematic illustration of a spoke in a side view;

FIG. 4 a cross section of the spoke according to FIG. 2;

FIG. 4*a* a cross section of a configuration of the spoke according to FIG. 2;

DETAILED DESCRIPTION

Figure 5:
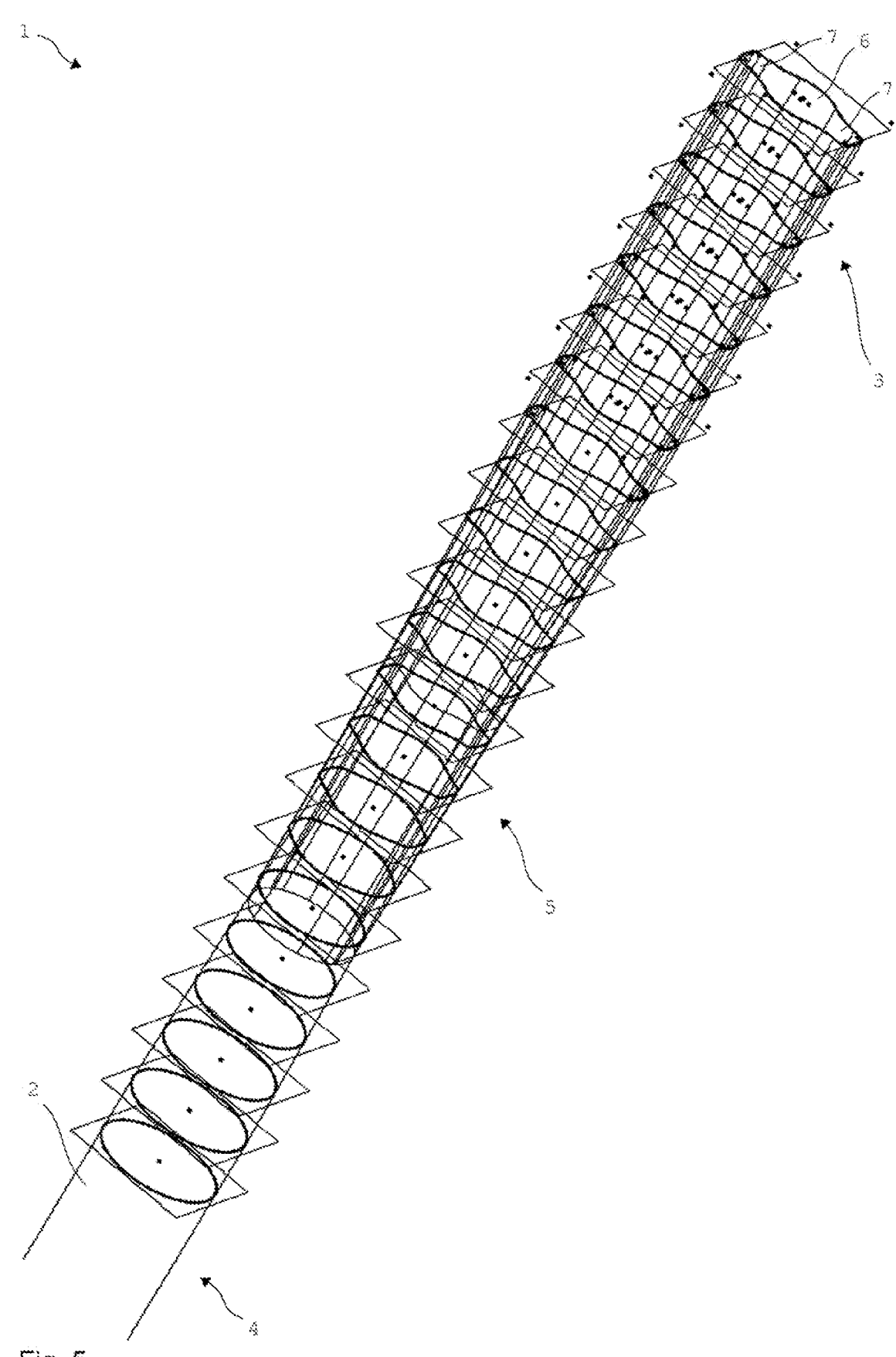
FIG. 5 a detail illustration of the spoke according to FIG. 2 in a perspective view.

FIG. 1 shows a schematic illustration of an at least partially muscle-powered bicycle (101). The bicycle 101 includes two wheels 100, a front wheel and a rear wheel. Furthermore a frame 104, a fork 105, a handlebar 107, and a saddle 106 are provided. The drive provided is by pedals, and presently, a derailleur. The drive may also comprise electric assistance. The front wheel and the rear wheel are each attached to dropouts at the fork 105 respectively the frame 104.

The wheels 100 each include a rim 103 and a hub 102, and spokes 1 manufactured according to the invention. The spokes 1 connect the rim 103 with the hub 102. The spokes 1 are shown schematically only, due to the image scale.

A spoke 1 according to the invention will now be described with reference to the FIGS. 2 to 5. The spoke 1 is for example manufactured according to the method according to the invention.

The spoke 1 comprises a spoke body 2 and a spoke head 52, and a thread 62 for a screwed connection with a spoke nipple, not shown. The spoke body 2 extends between a rim-side end 12, where the thread 62 is disposed, and a hub-side end 22, where the spoke head 52 is disposed. In the variant of the FIGS. 2 and 3, the head 52 is angled (what is known as a cranked spoke 1 respectively cranked-head spoke). In the variant of the FIG. 3*a*, the head is disposed straight (what is known as a straight-pull spoke respectively straight-head spoke).

One end portion 4 of the spoke body 2 is attributed to each of the ends 12, 22. A central section 3 constituting the greater part of the spoke 1 extends between the ends 12, 22. One transition section 5 each is disposed between the central section 3 and the end portions 4.

In the central section 3 and in the transition sections 5 the spoke body 2 is provided with a body 6 and two wings 7. The wings 7 extend on opposite longitudinal faces of the body 6, and presently both are identical.

This spoke 1 is configured as one-piece and is for example manufactured from a stainless steel alloy. Thus, the spoke body 2 and the spoke head 52, and the thread 62 as well as all the sections 3, 4, 5 of the spoke body 2, and also the body 6 and the wings 7, are integrally interconnected.

The central section 3 shows a minimal diameter 13 that is smaller than the minimal diameter 14 of the end portions 4. Each of the transition sections 5 show a minimal diameter 15 decreasing in the direction of the central section 3. The differences in the diameters 13, 14 are thus continuously bridged by the transition sections 5.

FIG. 4 shows a cross section of the central section 3. It can be clearly seen that the body 6 has a section height 16 that is larger than the section height 17 of the wings 7. The body 6 has a rounded, cross-sectional geometry (see dashed-line circle). In the transition sections 5 and in the central section 3, the cross-sectional geometry of the spoke body 2 is configured so that the wings 7 each make a transition to the body 6 in a curved outline 82 showing a turning point 182. To this end, the wings 7 are configured suitably curved on their principal sides 37. Thus, the section height 17 of the wings 7 increases in the direction of the body 6. The wings 7 show a convex line on their short sides 27.

The transition section 5 and its geometric properties are particularly clearly visible in the enlarged detail illustration of the FIG. 5. The wings 7 and the body 6 show a variable cross-sectional geometry in the transition sections 5. The width 47 of the wings 7 is configured increasing in the direction of the central section 3 in the transition sections 5. The section height 17 of the wings 7 decreases in the direction of the central section 3 in the transition sections 5. The section height 16 of the body 6 decreases in the direction of the central section 3 in the transition sections 5.

The width 47 is for example 2.3 mm. The section height 16 of the body 6 is for example 1.3 mm.

FIG. 4*a* shows a cross section of the central section 3 of a configuration of the spoke 1 described above. It can be clearly seen that the body 6 shows a section height 16 somewhat larger than in FIG. 4. This section height 16 is for example 1.5 mm. Moreover, the section height 17 of the wings 7 is larger. The width 47 of the wings 7 is the same as in the spoke according to FIG. 4. This spoke 1 may be used for example in the case of increased requirements to the stability of the wheels 100, for example in mountain bikes.

When the spokes 1 are manufactured, a spoke blank 8 is first manufactured. This step will now be described with reference to the FIGS. 6 to 8.

Firstly, a (continuous) wire material 18 is reshaped to obtain a spoke blank 8 by way of cold forging by means of a forging device 28. At the start, the wire material 18 is substantially cylindrical, showing for example a diameter 180 of slightly more than 2 mm, for example 2.2 mm or 2.3 mm.

Figure 6:
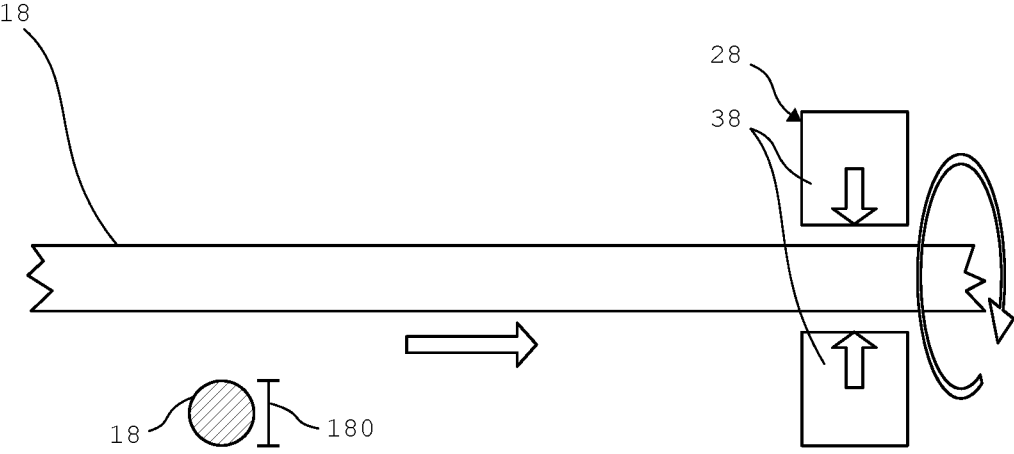
FIG. 6 a simplistic illustration of a process step when manufacturing a spoke blank.

The cold forging of the wire material 18 is performed with a forging device 28, as it is outlined in the FIG. 6. Two impacting tools 38 disposed opposite one another continuously strike the wire material 18, while rotating around its longitudinal axis. At the same time the wire material 18 advances in its longitudinal direction and relative to the impacting tools 38. Due to the impacts, the wire material 18 is reduced in its diameter 180. The reduced diameter can be preset by the force at which the impacting tools 38 act on the wire material 18.

Figure 7:
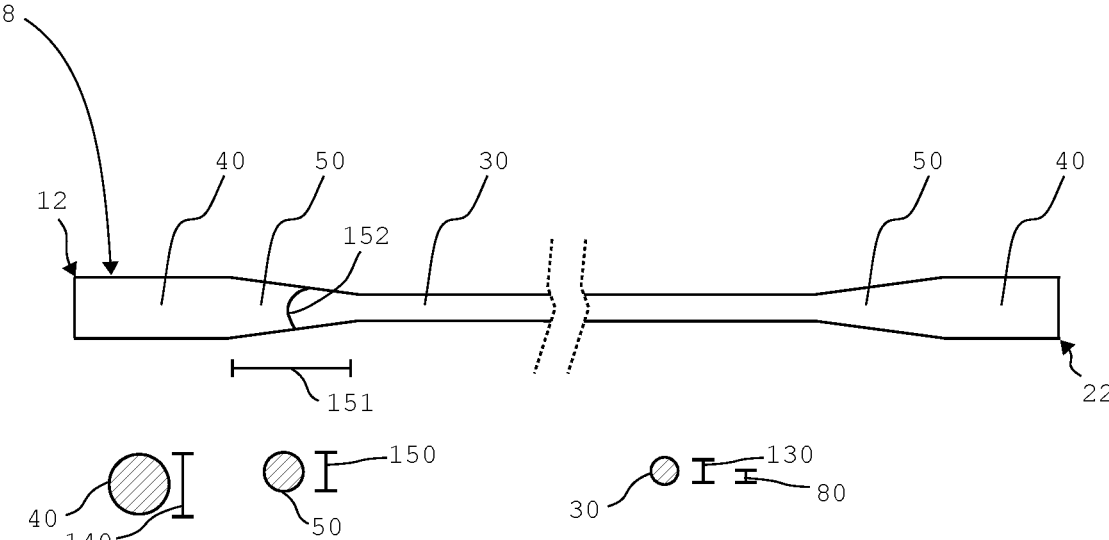
FIG. 7 a simplistic illustration of a spoke blank in a side view, and sections of the spoke blank.

Following the cold forging by means of the forging device 28, the wire material 18 is cut to the desired lengths, so as to obtain the spoke blank 8 illustrated in the FIG. 7.

The spoke blank 8 comprises a pre-stage 30 for the central section 3, and two pre-stages 40 for the end portions 4, and two pre-stages 50 for the transition sections 5. Here, the pre-stages 30, 40 for the central section 3 and for the end portions 40 had been forged cylindrically. The pre-stage 30 of the central section 3 was reduced more than the pre-stages 40 of the end portions 4.

For example, the diameter 130 of the pre-stage 30 of the central section 3 is 1.57 mm+0.03 mm−0 mm. The diameter 140 of the pre-stages 40 of the end portions 4 is for example 2 mm+0.02 mm−0 mm. This spoke blank 8 offers particular ease of forging for example a spoke 1 as it is described with reference to FIG. 4.

In another, likewise advantageous example, the diameter 130 of the pre-stage 30 of the central section 3 is 1.75 mm+0.03 mm−0 mm. The diameter 140 of the pre-stages 40 of the end portions 4 is for example 2 mm+0.02 mm−0 mm. This spoke blank 8 offers particular ease of forging for example a spoke 1, as it is described with reference to FIG. 4a.

The spoke blank 8 described below, and its processing, are for example particularly advantageous for manufacturing the spokes 1 according to FIG. 4 and FIG. 4a.

The pre-stages 50 of the transition sections 5 have been forged conically. Thus, the pre-stages 50 bridge the various diameters 130, 140 of the adjacent pre-stages 30, 40. The conical configuration causes the diameter 150 of the pre-stage 50 of the transition section 5 to decrease in the direction of the pre-stage 30 of the central section 3.

Figure 8:
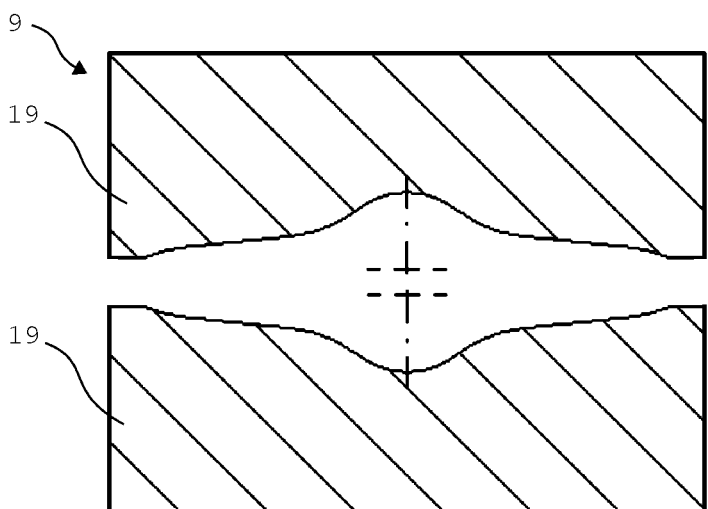
FIG. 8 a schematic detail illustration of a shaping tool for reshaping a spoke blank in a side section view.

Thereafter, the spoke blank 8 is inserted into a shaping tool 9, as it is illustrated in the FIG. 8. The shaping tool 9 comprises two tool units 19, which together reproduce a negative shape of the final spoke body 2 provided. In the transverse, sectional view of the shaping tool 9, the future cross-sectional geometry of the spoke body 2 with the body 6 and the wings 7 can be clearly seen.

The negative shape for the body 6 serves as a guide for inserting, and, in particular, also for the reshaping proper. Such a guide, in particular, manufactures straight spokes 1. Post-processing, wherein the spokes 1 are straightened, can thus be dispensed with.

The spoke blank 8 is placed between the tool units 19. The tool units 19 are moved toward one another so as to reshape the spoke blank 8. The reshaping by means of the shaping tool 9 is likewise configured as a cold forging process. Following the reshaping by means of the shaping tool 9, the spoke body 2 shows the geometry as it has been described above in the FIGS. 2 to 5.

The first cold forging obtains a spoke blank 8 having a particularly high tensile strength and fracture strength. The subsequent cold forging of the spoke blank 8 then provides the spoke 1 with its new, respectively final, cross-sectional geometry, so that for example the aerodynamic properties are improved. Moreover, the tensile strength/fracture strength is even more improved by way of the subsequent cold forging process.

However, such a two-stage manufacture of the spoke 1 may be problematic on the whole since, in particular, the second cold forging step may result in an undesired deterioration of the reliability of the spoke 1. For example, the spoke blank 8 may be configured as a blade spoke by pressing it locally flat. In some cases, however, it has been observed that these blade spokes may show a poorer strength than the spoke blank 8 used. Therefore, one of the objects of the presently presented invention is to counteract such deterioration. The presently illustrated invention offers an option to configure the spoke blank 8 by another cold forging step with a new cross-sectional geometry, wherein its strength is even considerably improved.

What is particularly decisive for the strength and reliability of the finished spoke 1 is, how and in which positions of the spoke blank 8 the new cross-sectional geometry is shaped. In the spoke 1 presently illustrated, for example the cylindrical shape of the pre-stages 40 of the end portions 4 is maintained in sections or even completely. The cylindrical pre-stage 30 of the central section 3, however, is reshaped continuously and uniformly. The pre-stages 50 of the transition sections 5 are reshaped only slightly, adjacent to the pre-stages 40 of the end portions 4, and increasingly stronger in the direction of the pre-stage 30 of the central section 3.

The pre-stages 50 of the transition sections 5 and the shaping tool 9, in particular, are matched to one another so that the strength of the reshaping basically follows the decreasing diameter of the pre-stages 50 of the transition sections 5. This can be seen most clearly for example in the FIG. 5. While the end portion 4 is still cylindrical, the width 47 of the wings 7 in the transition section 5 increases in the direction of the central section 3 to the extent that the diameter 150 of the conical pre-stage 50 of the transition section 5 has decreased in the direction of the central section 3. Thus, a particularly optimized transition ensues between the new geometry of the spoke body 2 and the original geometry of the spoke blank 8, so as to avoid inconvenient stress concentrations even given high loads, and to ensure even progress of forces.

Moreover it is taken into account that the length 151 of the pre-stages 50 of the transition sections 5 has a particular effect on the properties of the spoke 1, following the second cold forging. Therefore, the pre-stages 50 of the transition sections 5 are forged in a length 151 (see FIG. 7) deviating a maximum of one fifth from the provided length 25 (see FIGS. 2 and 3) of the finished transition sections 5.

In the example shown, the length 151 of the pre-stages 50 is 9 mm+/−1 mm. The length 25 of the finished transition sections 5 is for example 9 mm. These dimensions offer optimal matching of the spoke blank 8 to the second cold forging process and particularly to the negative shape of the shaping tool 9. Thus, the second cold forging improves the aerodynamic properties of the spoke 1, without degrading the strength compared to the spoke blank 8.

Moreover it is advantageous that the pre-stages 50 of the transition sections 5 each show a cone angle 152 (see FIG. 7; opening angle of the cone) of maximally 11°. The spoke blank 8 shown has a cone angle 152 for example of 6.3°. Such a cone angle 152 manufactures the spoke blank 8 with a particularly good tolerance for the length 151 of the pre-stage 50, combined with an economic advance rate for the wire material 18.

In order to maintain the advantageous properties of the forged spoke blank 8 even following the second reshaping step, the new cross-sectional geometry of the spoke body 2 is moreover optimally matched to the geometry of the spoke blank 8 and, in particular, to the conical geometry of the pre-stage 50 of the transition section 5. To this end, the spoke body 2 is shaped such that the minimal diameter 13 of the central section 3 is less than the minimal diameter 14 of the end portions 4. Moreover, the transition sections 5 of the finished spoke body 2 are shaped such that each shows a minimal diameter 15 decreasing in the direction of the central section 3. It is thus possible to provide the spoke body 2 with a new geometry without adversely changing the original strength and shape of the spoke blank 8.

A particularly advantageous option of bringing the geometry of the finished spoke body 2 in congruence with the spoke blank 8, is also offered by the cross-sectional geometry shown, with the body 6 and the wings 7. Thus, there ensue the relationships shown in the FIG. 12 between the cross sectional area 32 and the cross sectional circumference 42.

Figure 9:
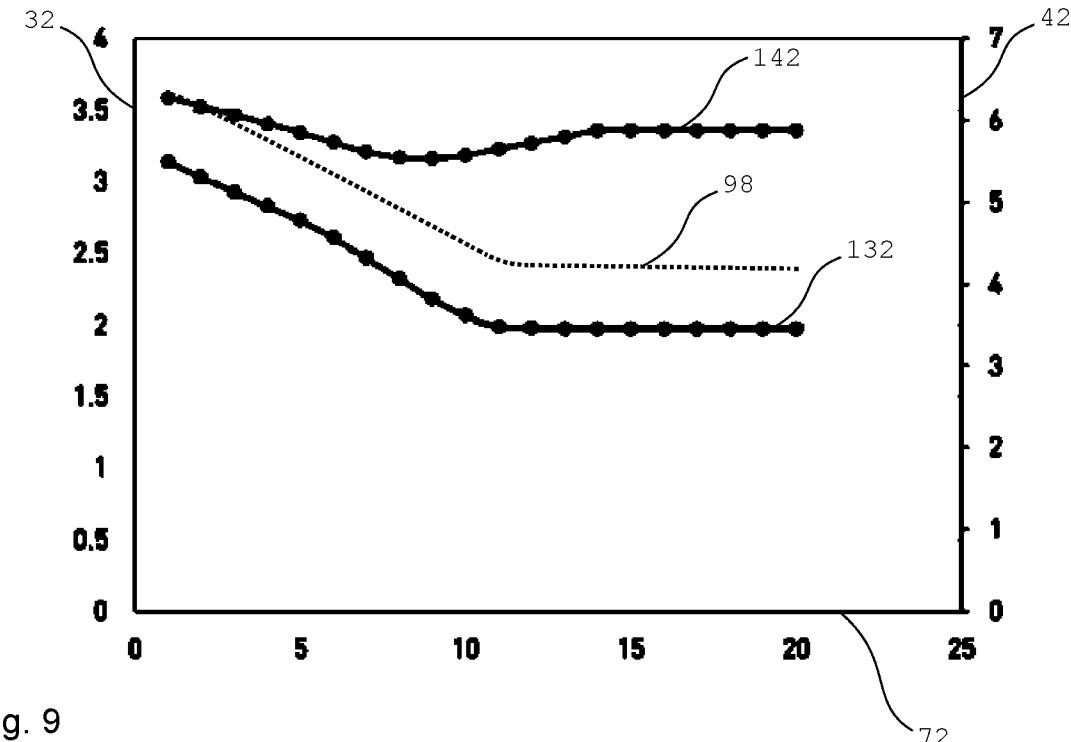
FIG. 9 a sketch illustrating geometric properties of a spoke.

In the diagram of the FIG. 9 the cross sectional area 32 and the circumferential length 42 of the spoke body 2 shown in the FIG. 5 are plotted over their length in a number of reference points 72. For better illustration, the reference points 72 are also illustrated in the FIG. 5. Moreover, the reference points in the FIG. 5 are illustrated as sections, so that the pertaining cross-sectional geometry is particularly clearly seen along the longitudinal axis.

In the diagram of the FIG. 9 the outline 132 of the cross sectional area of the spoke body 2 is plotted. Moreover, the outline 142 of the circumferential length 42 of the spoke body 2 is plotted. The outline 98 of the circumferential length 42 of the pre-stages 30, 40, 50 of the spoke blank 8, from which the spoke body 2 of the FIG. 5 was shaped, is shown in broken lines. Since, when reshaping the spoke blank 8 to obtain the spoke body 2, the cross sectional area 32 was changed only insignificantly, the outline 132 is a very good approximation to the outline of the cross sectional area 32 of the spoke blank 8.

It can be clearly seen that the spoke blank 8 originally showed an outline 98 of the circumferential length 42, which is substantially proportional to the outline 132 of the cross sectional area 32. It can also be clearly seen that the reshaping of the spoke blank 8 by means of the shaping tool 9 generated a spoke body 2 showing a considerably greater circumferential length 42 than the spoke blank 8. The circumferential length 42 firstly decreases less than does the cross sectional area 32 and the circumferential length 42 of the spoke blank 8. Thereafter, the circumferential length 42 increases again within the transition section 5, increasing until it remains substantially constant within the central section 3.

Such an optimized matching of the cross sectional area 32 and the circumferential length 42 in the region of the transition sections 5 achieves that the reshaping of the spoke blank 8 does not result in undesired weakening of the spoke 1. It is a particular advantage that the circumferential length 42 is already specifically matched in the transition sections

5, while the cross sectional area 32 is substantially maintained, compared to the pre-stage 50 of the transition section 5.

The invention presently illustrated, in particular, offers optimized pre-stages 50 of the transition sections 5, and a particularly ideal congruence of the forged spoke blank 8 with the negative shape of the shaping tool 9 for the final shaping of the finished spoke body 2. Moreover, the method illustrated allows particular uncomplicated and economic implementation of these advantages. The invention offers another advantage by the specific final shaping of the body 6 and the wings 7 from a spoke blank 8 that is first optimally matched to this cross-sectional shape. The final shaping of the body 6 and the wings 7 ensues in a particularly advantageous combination of a circular with a flat spoke cross section, so as to allow obtaining particularly high strength values and particularly high elongation at break, with a minimal weight of the spoke 1. This specific final shaping of the cross-sectional geometry considerably increases the fracture strength as compared to the spoke blank 8 or to a conventional double-butted spoke.

The dimensioning described of the spoke blank 8 in combination with the impacting tool 38 presented, allows particularly uncomplicated manufacture of particularly precise and, in particular, ideally symmetrical transitions in the scope of manufacturing the spoke blank 8. At the same time, this ensues in a considerably improved matching of the spoke blank 8 with the shaping tool for the further reshaping.

It has been shown in tensile tests that an optimized combination of high tensile strength and high expansion strength is achieved. Moreover, it has been shown in tensile tests that the fracture points do no longer, or only rarely, lie in the transition sections 5, and that the fracture strength was increased overall. Furthermore, the invention considerably reduces the reject rate in spoke manufacture.

While a particular embodiment of the present spoke, and method of manufacturing a spoke have been described herein, it will be appreciated by those skilled in the art that changes and modifications may be made thereto without departing from the invention in its broader aspects and as set forth in the following claims.

LIST OF REFERENCE NUMERALS 1 spoke
2 spoke body
3 central section
4 end portion
5 transition section
6 body
7 wing
8 spoke blank
9 shaping tool
12 end
13 diameter
14 diameter
15 diameter
16 section height
17 section height
18 wire material
19 tool unit
22 end
25 length
27 short sides
28 forging device
30 pre-stage
32 cross-sectional area 37 principal sides
38 impacting tool
40 pre-stage
42 cross sectional circumference
47 width
50 pre-stage
52 spoke head
62 thread
72 reference point
80 radius
82 outline
98 outline
100 wheel
101 bicycle
102 hub
103 rim
104 frame
105 fork
106 saddle
107 handlebar
130 diameter
132 outline
140 diameter
142 outline
150 diameter
151 length
152 cone angle
180 diameter
182 turning point

The invention claimed is:

1. A method of manufacturing a spoke for a wheel of an at least partially muscle-powered bicycle, having a spoke body, wherein the spoke body in an installed position in a wheel, comprises a hub-side, first end and a rim-side, second end, and wherein the spoke body comprises at least one central section extending between the ends, wherein one end portion is attributed to each of the ends, and wherein one transition section each is disposed between the central section and the end portions, comprising the following process steps:

reshaping a wire material to obtain a spoke blank by means of a forging device;

wherein the spoke blank includes pre-stages of the central section and of the end portions and of the transition sections; wherein the pre-stages of the central section and of the end portions are forged cylindrically, so that the pre-stage of the central section shows a smaller diameter than do the pre-stages of the end portions; wherein the pre-stages of the transition sections are forged conically, so that they show a diameter decreasing in the direction of the central section;

and wherein the pre-stages of the transition sections are each manufactured in a length, which differs by a maximum of one fourth from the pertaining length of the transition sections;

inserting the spoke blank in a shaping tool, which reproduces a negative shape of the spoke body; and reshaping the spoke blank by means of the shaping tool, wherein at least the transition sections and the central section are each provided with a cross-sectional geometry different from their pre-stages.

2. The method according to claim 1, wherein the minimal diameter of the central section is smaller than the minimal diameter of the end portions, and wherein the transition sections each show a minimal diameter decreasing in the direction of the central section.

3. The method according to claim 1, wherein the pre-stages of the transition sections each show a cone angle of maximally 11°.

4. The method according to claim 1, wherein due to the reshaping by means of the shaping tool, the transition sections are each provided with a minimal diameter decreasing in the direction of the central section, and wherein the decrease of the minimal diameter corresponds to the pertaining diameters of the pre-stages of the transition sections.

5. The method according to claim 1, wherein the pre-stages of the transition sections are manufactured in a length at least 14 times the differential amount between the diameter of the pre-stage of the central section and the diameter of the pre-stages of the end portions, and wherein the pre-stages of the transition sections each show a length of at least 7 mm.

6. The method according to claim 1, wherein the transition sections each show a length at least 5 times the minimal diameter of the central section.

7. The method according to claim 1, wherein the difference in diameters between the diameter of the pre-stage of the central section and the pertaining diameters of the pre-stages of the end portions is between 0.4 mm and 0.8 mm, and wherein the pre-stages of the transition sections bridge said difference in diameters.

8. The method according to claim 7, wherein the section height of the spoke body decreases in the direction of the central section at least in one of the transition sections.

9. The method according to claim 1, wherein the reshaping of the spoke blank by means of the shaping tool forms the spoke body, wherein at least 75% of the length of the transition sections are used to match the minimal diameter of the central section to the pertaining minimal diameter of the end portions.

10. The method, according to claim 1, wherein the reshaping of the spoke blank by means of the shaping tool reshapes at least the pre-stages of the transition sections and the pre-stage of the central section, such that their cross sectional circumferences are each modified to a greater extent than their cross sectional area.

11. The method, in particular according to claim 1, wherein the spoke blank is reshaped by means of the shaping tool, such that at least the central section is provided with a larger cross sectional circumference than its pre-stage, and/or that at least the transition sections are each provided with a larger cross sectional circumference than their pre-stages.

12. The method according to claim 1, wherein in the transition sections, the cross sectional area of the spoke body decreases in the direction of the central section where the circumferential length of the cross section of the spoke body either decreases by a smaller measure than does the cross sectional area, or even increases.

13. The method according to claim 1, wherein the spoke blank is reshaped by means of the shaping tool, such that the spoke body has a body and two wings at least in the transition sections, at least in sections, wherein the wings extend on opposite longitudinal faces of the body.

14. The method according to claim 13, wherein the width of the wings is configured increasing at least where the diameters of the pre-stages of the transition sections had previously been configured decreasing.

15. The method according to claim 13, wherein the wings and the body extend as far as into at least one of the two end portions.

16. The method according to claim 13, wherein the wings and/or the spoke body show a variable cross-sectional geometry in at least one of the transition sections.

17. The method according to claim 16, wherein the width of the wings increases in the direction of the central section at least in one of the transition sections.

18. The method according to claim 16, wherein the section height of the wings decreases in the direction of the central section at least in one of the transition sections.

19. The method according to claim 1, wherein the reshaping of the wire material to obtain the spoke blank is done by cold forging of the wire material by means of at least two impacting tools of the forging device disposed opposite each other and impacting on the wire material while rotating about the longitudinal axis of the wire material.

20. A spoke manufactured by a method according to claim 1, for a wheel of an at least partially muscle-powered bicycle, comprising: a spoke body, the spoke body in the installed position in the wheel, comprises a hub-side, first end and a rim-side, second end; wherein the spoke body comprises at least one central section extending between the ends;

wherein one end portion each is attributed to the ends; wherein the minimal diameter of the central section is smaller than the minimal diameter of the end portions;

wherein one transition section each is disposed between the central section and the end portions; wherein the transition section shows a minimal diameter decreasing in the direction of the central section;

wherein the spoke body includes a body and two wings at least in the transition sections, at least in sections; wherein the wings extend on opposite longitudinal faces of the body, and that the transition sections each show a length that is at least 4 times the minimal diameter of the central section, and/or at least 3.5 times the minimal diameter of the end portions; and that the width of the wings increases in the direction of the central section in at least one of the transition sections.

\* \* \* \* \*